United States Patent
Spears et al.

(10) Patent No.: US 12,158,939 B1
(45) Date of Patent: Dec. 3, 2024

(54) AUTHENTICATION ARTIFACT GENERATION USING SINGLE SIGN-ON

(71) Applicant: Amazon Technologies, Inc., Seattle, WA (US)

(72) Inventors: Wesley Thomas Spears, Seattle, WA (US); David Ruysser Gabler, Atascadero, CA (US); Maciej Broda, Ottawa (CA); Yuk-Chung Eric Kam, Bethesda, MD (US); Anis Bishara, Chantilly, VA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 17/935,500

(22) Filed: Sep. 26, 2022

(51) Int. Cl.
  *G06F 21/41* (2013.01)
  *G06F 21/60* (2013.01)
  *H04L 9/08* (2006.01)
  *H04L 9/32* (2006.01)

(52) U.S. Cl.
  CPC ........... *G06F 21/41* (2013.01); *G06F 21/602* (2013.01); *H04L 9/0825* (2013.01); *H04L 9/3263* (2013.01)

(58) Field of Classification Search
  CPC ..... G06F 21/41; G06F 21/602; H04L 9/0825; H04L 9/3263
  See application file for complete search history.

(56) References Cited

U.S. PATENT DOCUMENTS

| | | | |
|---|---|---|---|
| 7,971,062 B1 * | 6/2011 | Hughes | H04L 9/0897 380/278 |
| 10,642,967 B2 | 5/2020 | Balaraman et al. | |
| 10,659,450 B2 | 5/2020 | Sridhar et al. | |
| 10,693,865 B2 | 6/2020 | Manza et al. | |
| 12,019,778 B1 * | 6/2024 | Bercovitz | G06F 21/6218 |
| 2019/0356650 A1 * | 11/2019 | Leavy | H04L 63/06 |
| 2021/0184864 A1 * | 6/2021 | Wentz | H04L 9/3218 |
| 2021/0266309 A1 * | 8/2021 | Guccione | H04L 63/0815 |
| 2023/0171238 A1 * | 6/2023 | Stocker | H04L 63/083 726/8 |

FOREIGN PATENT DOCUMENTS

| | | | | |
|---|---|---|---|---|
| AU | 2019210633 | | 8/2019 | |
| EP | 2973140 B1 * | | 2/2018 | G06F 21/54 |

* cited by examiner

*Primary Examiner* — Hee Soo Kim
(74) *Attorney, Agent, or Firm* — S. Scott Foster; Kowert, Hood, Munyon, Rankin & Goetzel, P.C.

(57) ABSTRACT

A device, having executed a single sign-on operation, may maintain a private device key in volatile memory. A client application may request an authentication artifact as part of obtaining authentication credentials for the device. Responsive to the request, an artifact may be signed with the private device key to generate the requested authentication artifact. The single sign-on operation may be authenticated using an authentication device and a wrap key generated and applied by a secure cryptographic processor using an identifier based on an attestation certificate obtained from the authentication device after successful authentication. The wrap key may be used to decrypt the private device key stored on a persistent device storage.

20 Claims, 8 Drawing Sheets

```
┌─────────────────────────────────────────────────────────────────┐
│ Obtain, by an authentication application executing on a computing device, an attestation │
│ certificate from an authentication device connected to the computing device responsive to a │
│ successful authentication using the authentication device 510 │
└─────────────────────────────────────────────────────────────────┘
                                    ↓
┌─────────────────────────────────────────────────────────────────┐
│ Generate, by the authentication application, an identifier for a wrap key stored in a │
│ secure cryptographic processing device implemented as part of the computing │
│ device based, at least in part, on the attestation certificate 520 │
└─────────────────────────────────────────────────────────────────┘
                                    ↓
┌─────────────────────────────────────────────────────────────────┐
│ Instruct, by the authentication application, the secure cryptographic processing │
│ device to decrypt a private device key obtained from a persistent storage of the │
│ computing device using the wrap key by including the identifier for the wrap key in │
│ the instruction 530 │
└─────────────────────────────────────────────────────────────────┘
                                    ↓
┌─────────────────────────────────────────────────────────────────┐
│ Receive the private device key from the secure cryptographic processing device │
│ 540 │
└─────────────────────────────────────────────────────────────────┘
                                    ↓
┌─────────────────────────────────────────────────────────────────┐
│ Store, by the authentication application, the private device key in a volatile storage │
│ of the computing device for subsequent use by the authentication application to │
│ perform one or more authentication operations 550 │
└─────────────────────────────────────────────────────────────────┘
                                    ↓
┌─────────────────────────────────────────────────────────────────┐
│ Delete, by the authentication application, the generated identifier for the wrap key │
│ 560 │
└─────────────────────────────────────────────────────────────────┘
```

AUTHENTICATION ARTIFACT GENERATION USING SINGLE SIGN-ON

BACKGROUND

Authenticated communications are the backbone for providing secure applications implemented across a wide variety of industries. Authentic communications ensure that access to resources or performance of operations is valid. For example, account specific information may be hosted or made available by a server to a client device in response to requests from the client device access the account specific information. Authentication may be used to ensure that the client device is associated with and authorized to access the account specific information. Upon secure local authentication at the client device, authentication credentials may be generated and provided for client applications, providing a superior user experience.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques for authentication artifact generation as part of providing authentication credentials after a single sign-on operation are described herein. Cookie or other token replay poses a significant security risk in authenticating interactions between devices and secured systems, services, or applications over a network. A replayed cookie or other token that was captured from an authorized device and sent from another unauthorized device may be indistinguishable based on the contents of the cookie or token at the secured system. Therefore, techniques that can avoid the use of replayable cookies by instead using single-use or limited duration use tokens, or nonces, are highly desirable and can reduce or eliminate weakness in computer-based communications. Such single or limited use tokens may be automatically generated and supplies as part of authentication credentials given secure local management of security secrets after a single sign-on operation is successfully performed.

Such techniques may be particularly desirable given the use of an authentication device to provide authenticated access to a secure cryptographic processing device that binds a computing device to the authentication device. For example, by using an authentication device to provide authenticated access to a secure cryptographic processing device that binds the computing device to the authentication device, as described in the various embodiments below, an on-device authentication application may be used to sign with a private device key tokens, such as nonces, or other artifacts that be included in communications for single use or limited use to provide authenticated communications that cannot be replayed to impersonate the authenticated device.

Figure 1:
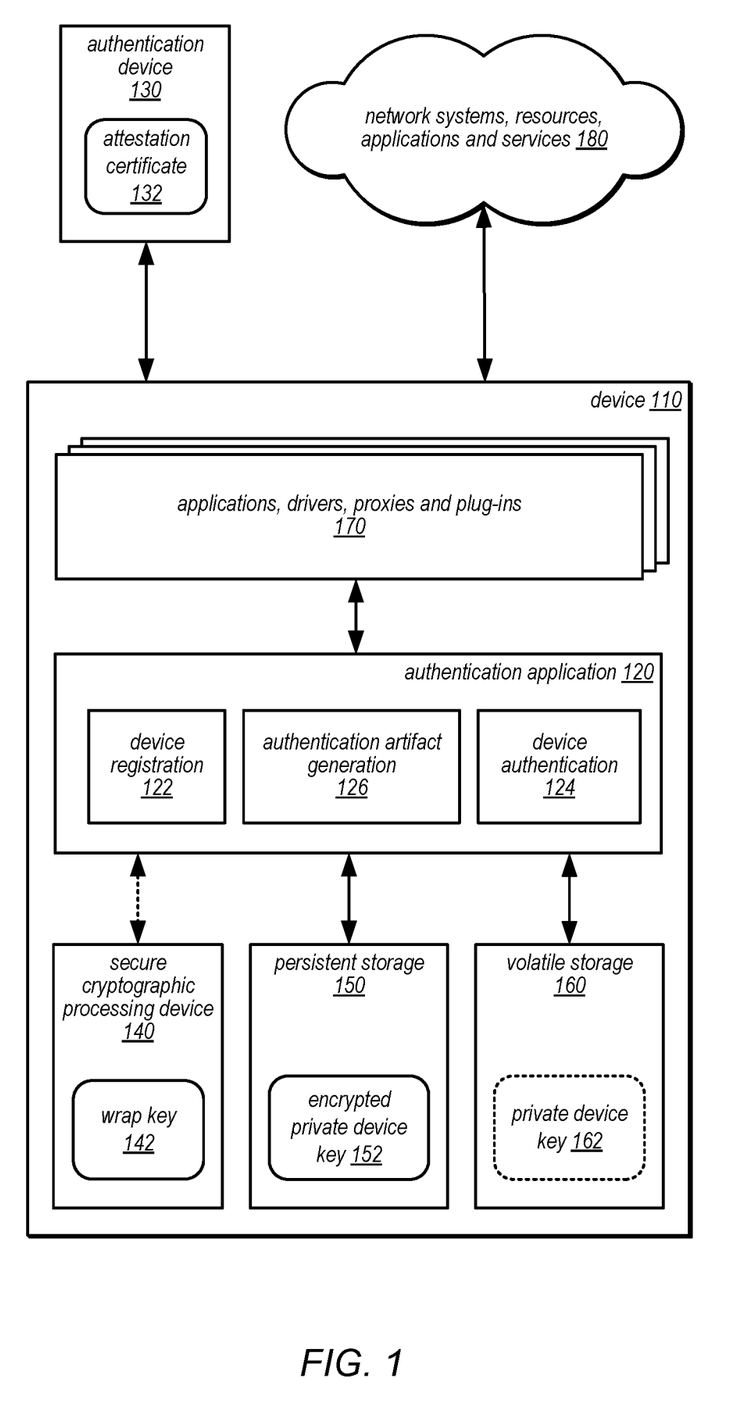
FIG. 1 illustrates a logical block diagram of using authentication artifact generation with single sign-on, according to some embodiments.

FIG. 1 illustrates a logical block diagram of using authentication artifact generation with single sign-on, according to some embodiments. Device 110 may be various types of computing device, including personal, portable, desktop, laptop, or various other computing devices described below with regard to computer system 1000 in FIG. 8. Device 110 may communicate over a network with various network systems, resources, applications and services 180 to perform various authorized activities (e.g., file access, application use, communications, etc.).

In various embodiments, a network may encompass any suitable combination of networking hardware and protocols necessary to establish network-based-based communications between clients, such as device 110, and network system(s), resources, applications or services 180. For example, network may generally encompass the various telecommunications networks and service providers that collectively implement the Internet. Network may also include private networks such as local area networks (LANs) or wide area networks (WANs) as well as public or private wireless networks. For example, both a given device 110 and network systems, resources, applications and services 180 may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and network systems, resources, applications and services 180.

Network systems, resources, applications and services 180 may include various public or private systems that offer services to be access through network at a device 110. In some embodiments, such services may include those services offered by a provider network. A provider network (which may, in some implementations, be referred to as a "cloud provider network" or simply as a "cloud") refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network via a publicly accessible network (e.g., the Internet, a cellular communication network). Regions are connected to a global network which includes private networking infrastructure (e.g., fiber connections controlled by the cloud provider) connecting each region to at least one other region. The provider network may deliver content from points of presence outside of, but networked with, these regions by way of edge locations and regional edge cache servers. This compartmentalization and geographic distribution of computing hardware enables the provider network to provide low-latency resource access to customers on a global scale with a high degree of fault tolerance and stability.

As noted above, provider network may implement various computing resources or services, which may be any other type of network based services, including various other types of storage (e.g., database service or an object storage service), compute, data processing, analysis, communication, event handling, visualization, and security services). In some embodiments, some of provider network services may be used to support various enterprise or organization operations, including various enterprise communication networks, applications, tools, or other services.

Various applications, drivers, proxies and application plugins 170 implemented on device 110 (e.g., web browsers or many other types of applications) may communicate with network systems, resources, applications and services 180 to perform authorized activities. Authentication application 120 may be executed on device 110, in various embodiments, in order to facilitate authenticated interactions with network systems, resources, applications and services 180.

For example, authentication application 120 may implement device registration 122 which may implement the techniques discussed below with regard to FIGS. 2 and 5. For example, authentication application 120 may detect an access attempt and provide a prompt (e.g., via a display or other interface) to utilize authentication device 130. Authentication device 130 may be a device that provides a challenge and response protocol with, upon successful response, return of a constant set of attributes from the authentication device (e.g., which may provide the attestation certificate). In at least some embodiments, the authentication device may be compliant with a standard such as the FIDO2 protocol, which may incorporate both a pin and user touch (e.g., of a button or touch-sensitive area of authentication device 130) to satisfy the challenge. After the response to the challenge is successful, attestation certificate 132 may be provided to authentication application 120 from authentication device 130, which may complete device 110 registration, generating a key pair to produce a public key which may be sent in a certificate signing request (CSR) to register device 110 at a registration service (which may be one of network systems, resources, applications and services 180). Device registration 122 may optionally use the attestation certification 132 to generate an identifier for a wrap key and instruct a secure cryptographic processing device 140 to create wrap key 142 to be accessible using the identifier (sometimes referred to as a "key handle"). Because secure cryptographic processing device creates and stores wrap key 142, the wrap key 142 is not accessible directly to other components of device 110. A private device key may also be generated and encrypted using wrap key 142 by sending a wrap function instruction to the secure cryptographic processing device 140 to encrypt the private device key, which may then be stored in persistent storage 150 as encrypted private device key 152.

Authentication application 120 may implement device authentication 124 to handle authentication after the device is registered. For example, as discussed in detail below with regard to FIGS. 3 and 4, authentication application 120 may detect an access attempt and provide a prompt (e.g., via a display or other interface) to utilize authentication device 130. After the response to the challenge is successful, attestation certificate 132 may be provided to authentication application 120. Authentication application 120 may generate an identifier to access wrap key 142 in secure cryptographic processing device 140 to decrypt encrypted private device key 152 (obtained from persistent storage 150 by authentication application 120) and then store the decrypted private device key 162 stored in volatile storage, as indicated at 162.

Authentication application 120 may implement authentication artifact generation 126 for applications, drivers, proxies and application plugins 170 to provide authenticated artifacts (e.g., tokens, such as nonces) that are signed by private device key 162, as discussed below with regard to FIGS. 3 and 6. In some embodiments, authentication application 120 may also attest the state of the device (e.g., on a periodic or aperiodic basis), signing the state with the private device key 162 to signify the continuing authenticated state of the device 110.

Please note that the previous description of using an authentication device to provide authenticated access to a secure cryptographic processing device that bound a computing device to the authentication device is merely provided as a logical example. Different numbers of components or configuration of components may be implemented.

This specification continues with a general description of different interactions for using an authentication device to provide authenticated access to a secure cryptographic processing device that bound a computing device to the authentication device. A number of different methods and techniques to implement using an authentication device to provide authenticated access to a secure cryptographic processing device that bound a computing device to the authentication device are then discussed, some of which are illustrated in the accompanying flowchart. Various examples are provided throughout the specification.

Figure 2:
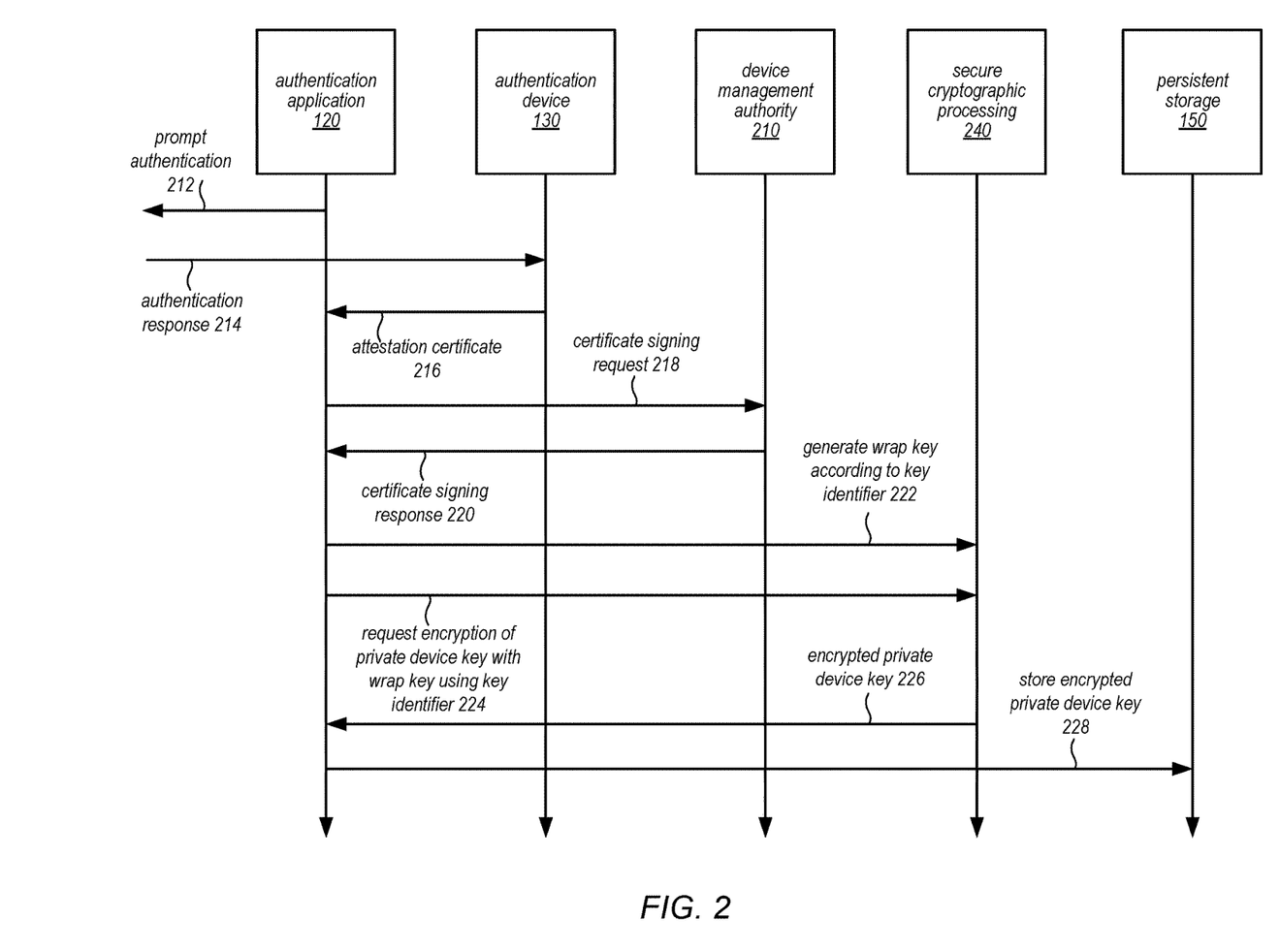
FIG. 2 is a sequence diagram illustrating interactions to register a device using an authentication device to provide authenticated access to a secure cryptographic processing device that bound a computing device to the authentication device, according to some embodiments.

FIG. 2 is a sequence diagram illustrating interactions to register a device using an authentication device to provide authenticated access to a secure cryptographic processing device that bound a computing device to the authentication device, according to some embodiments. Authentication application 120 may detect an access attempt by a user, or client, of the device 110. Responsive to this detection, authentication application 120 may prompt authentication, as indicated at 212, to the client. The client may then provide an authentication response 214 which may be evaluated and provided using authentication device 130. Authentication device 130 may be connected to a device implementing authentication application 120 (e.g., via a peripheral device port, such as a Universal Serial Bus (USB) port). Authentication device 130 may provide an attestation certificate 216 to authentication application 120 upon successful evaluation of the prompt. Authentication application 120 may then generate a key pair and send a certificate signing request (CSR) 218 with the public key to device management authority 210 (e.g., over a network connection as device management authority 210 may be a remote system, service or application (e.g., hosted on a server)). Device management authority 210 may track devices registered for a service or services for an organization or other entity, in some embodiments. The CSR response 220 may be returned indicating registration of the device with device management authority 210.

As indicated at 222, authentication application 120 may send an instruction to secure cryptographic processing function 240, such as provided by the secure cryptographic processing device 240 as shown in FIG. 1, to generate a wrap key using a key identifier generated by authentication application 120 based on the attestation certificate, as discussed in detail below with regard to FIGS. 4 and 5. Secure cryptographic processing function 240 may generate the wrap key and store it for use when invoked by other requests, such as wrap or unwrap functions to encrypt or decrypt using the wrap key.

As indicated at 224, authentication application 120 may send a request to instruct encryption of a private device key with the wrap key using the key identifier for the wrap key. Secure cryptographic processing function 240 may encrypt the private device key using the wrap key and return the encrypted private device key, as indicated at 226. Authentication application may then store the encrypted private device key in persistent storage 150.

Figure 3:
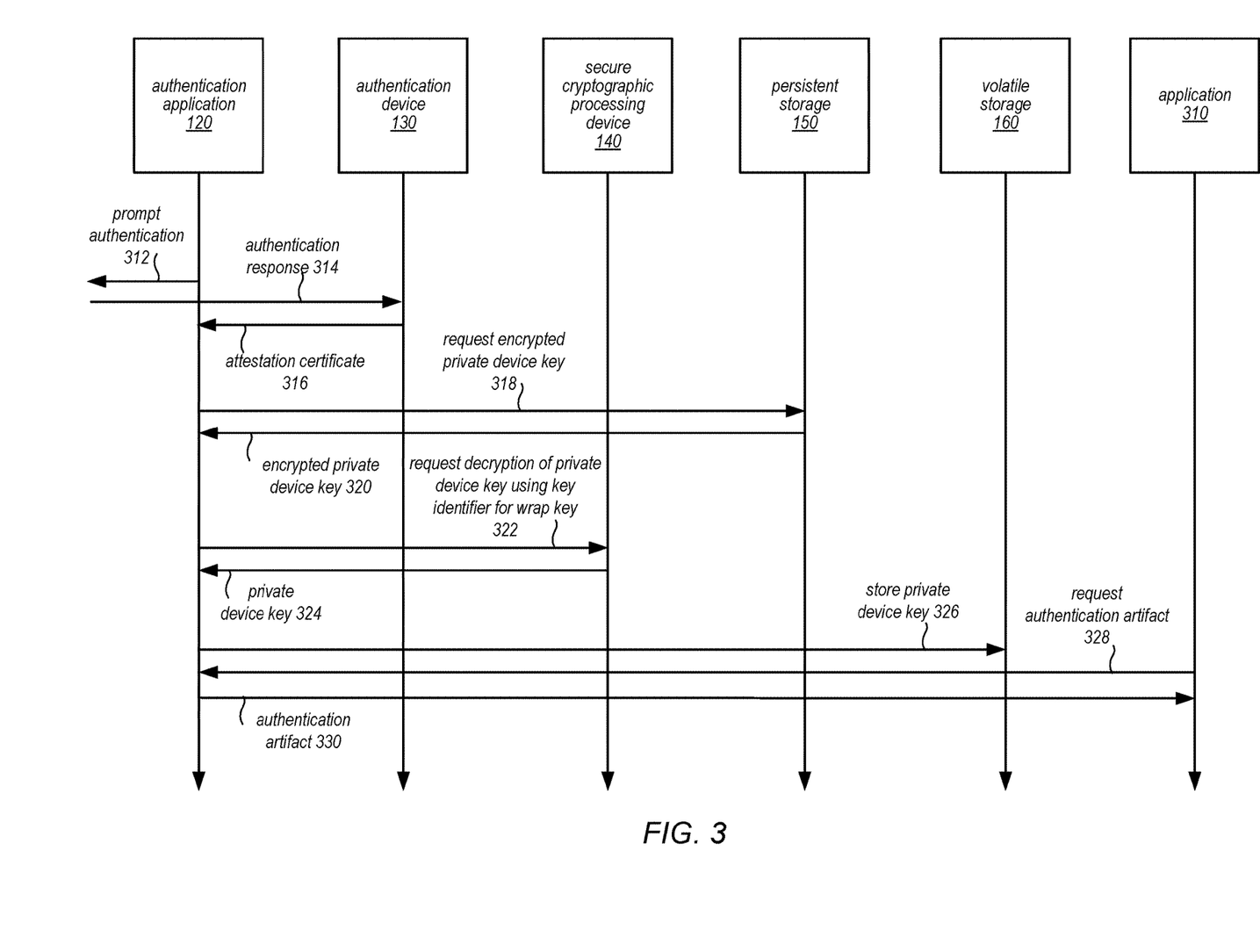
FIG. 3 is a sequence diagram illustrating interactions for using an authentication device to provide authenticated access to a secure cryptographic processing device that bound a computing device to the authentication device, according to some embodiments.

FIG. 3 is a sequence diagram illustrating interactions for using an authentication device to provide authenticated access to a secure cryptographic processing device that bound a computing device to the authentication device, according to some embodiments. As above, authentication application 120 may detect an access attempt by a user of the device 110. Authentication application 120 may prompt authentication, as indicated at 312. Authentication response 314 may be evaluated and provided using authentication device 130. Authentication device 130 may provide an attestation certificate 316 to authentication application 120.

Authentication application 120 may request the encrypted private device key from persistent storage 150 as indicated at 318. The encrypted private device key may be returned as indicated at 320. Authentication application 120 may generate an identifier based on the attestation certificate and/or other attributes (using the same technique to generate the identifier when the wrap key was created as part of device registration above) and then request decryption of the encrypted private device key using the key identifier for the wrap key, as indicated at 322, from secure cryptographic processing function 240. Secure cryptographic processing function 240 may use the wrap key to decrypt the private device key and return it, as indicated at 324. Authentication application 120 may store the private device key in volatile storage 160, as indicated at 326, for subsequent authorization operation use. For example, as discussed in detail below with regard to FIG. 7, an application 310 may request 328 an authentication artifact which authentication application 120 may return, as indicated at 330 for use by application 310.

The examples discussed above with regard to FIGS. 1-3 have been given in regard to an example authentication application and device. Note that various other types or configurations of authentication applications and devices, may be implemented to use an authentication device to provide authenticated access to a secure cryptographic processing device that bound a computing device to the authentication device and thus may implement these techniques. In addition to the examples given above, the techniques discussed below with regard to FIGS. 4 through 6 may be also implemented using the various components discussed above as well as different types of systems or devices that perform authentication.

Figure 4:
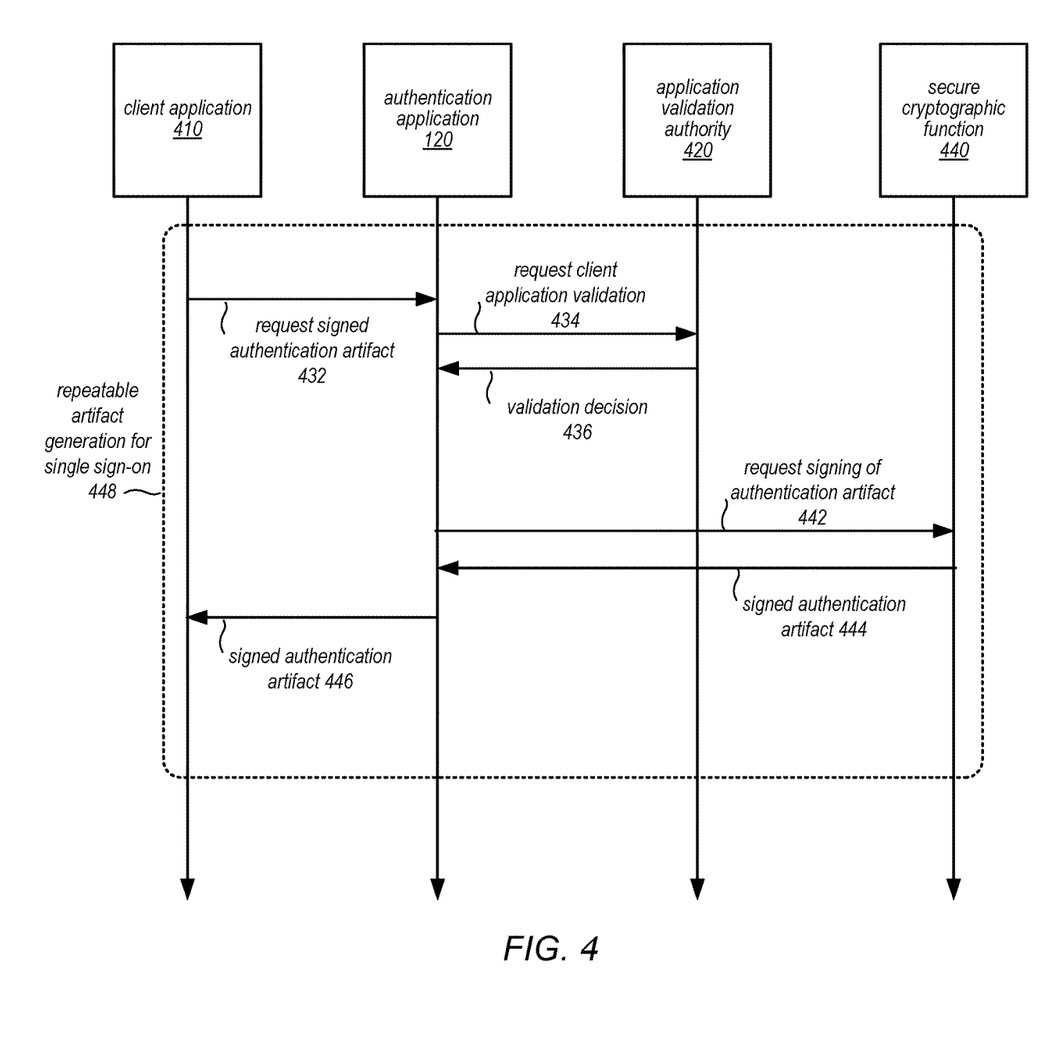
FIG. 4 is a sequence diagram illustrating interactions of a client application requesting a signed authentication artifact, according to some embodiments.

FIG. 4 is a sequence diagram illustrating interactions of a client application requesting a signed authentication artifact, according to some embodiments. Upon completion of a single sign-on operation, such as shown in steps 212-216 of FIG. 2 and 312-316 of FIG. 3, repeatable artifact generation 488 may be performed, in some embodiments. A client application 410, such as the applications, drivers, proxies and plug-ins 170 of FIG. 1, may request a signed authentication artifact 432 from an authentication application 120 such as the authentication applications 120 of FIGS. 1-3, in some embodiments. For sake of brevity, it is assumed that the authentication application 120 has previously performed the authentication, and various key generation steps 212-228 as shown in FIG. 2 or step 312-326 of FIG. 3. This, however, is not intended to be limiting and some or all of these steps may be performed responsive to the request 432, in some embodiments. Furthermore, while an exemplary embodiment may employ the authentication device 130, secure cryptographic function 440 and persistent storage 150 and volatile storage 160 as well as employ the various steps shown in FIGS. 2 and 3, this is not intended to be limiting. Indeed, any number of ways to generate an private device key suitable to sign an authentication artifact may be employed in various embodiments.

Upon receipt of the signed authentication artifact request, a request to validate the client application may be submitted 434, in some embodiments. The client application may be validated by the authentication application, in some embodiments, while in other embodiments an application validation authority 420 may be used. Some applications may not be known or trusted, therefore validation may prevent unknown or untrusted applications from obtaining an authentication artifact. In some embodiments, validation may include using signature validation that utilizes a certificate authority. In some embodiments, validation may include utilizing a hashing technique (e.g., to determine whether a hash value indicates in a list of authorized applications whether an individual application represented by the hash value exists.

Upon completion of client application validation, as indicated at 442, authentication application 120 may send a request to instruct signing of an authentication artifact with the to the secure cryptographic function 440, in some embodiments. The secure cryptographic function 440 may sign the authentication artifact using a private device key and return the signed authentication artifact, as indicated at 444. Authentication application may then send the signed authentication artifact to the client application 446, in some embodiments. The request 442 for a signed authentication artifact, and return of the signed artifact 444 and 446 may be repeated for multiple client applications on the device 110. In this way, a single sign-operation (e.g., a prompt for authentication via FIDO2 or other authentication technique as discussed above) may be used to allow multiple applications to use different, single-use authentication artifacts without performing multiple sign-ons for different remote systems, services, or applications.

Figure 5:
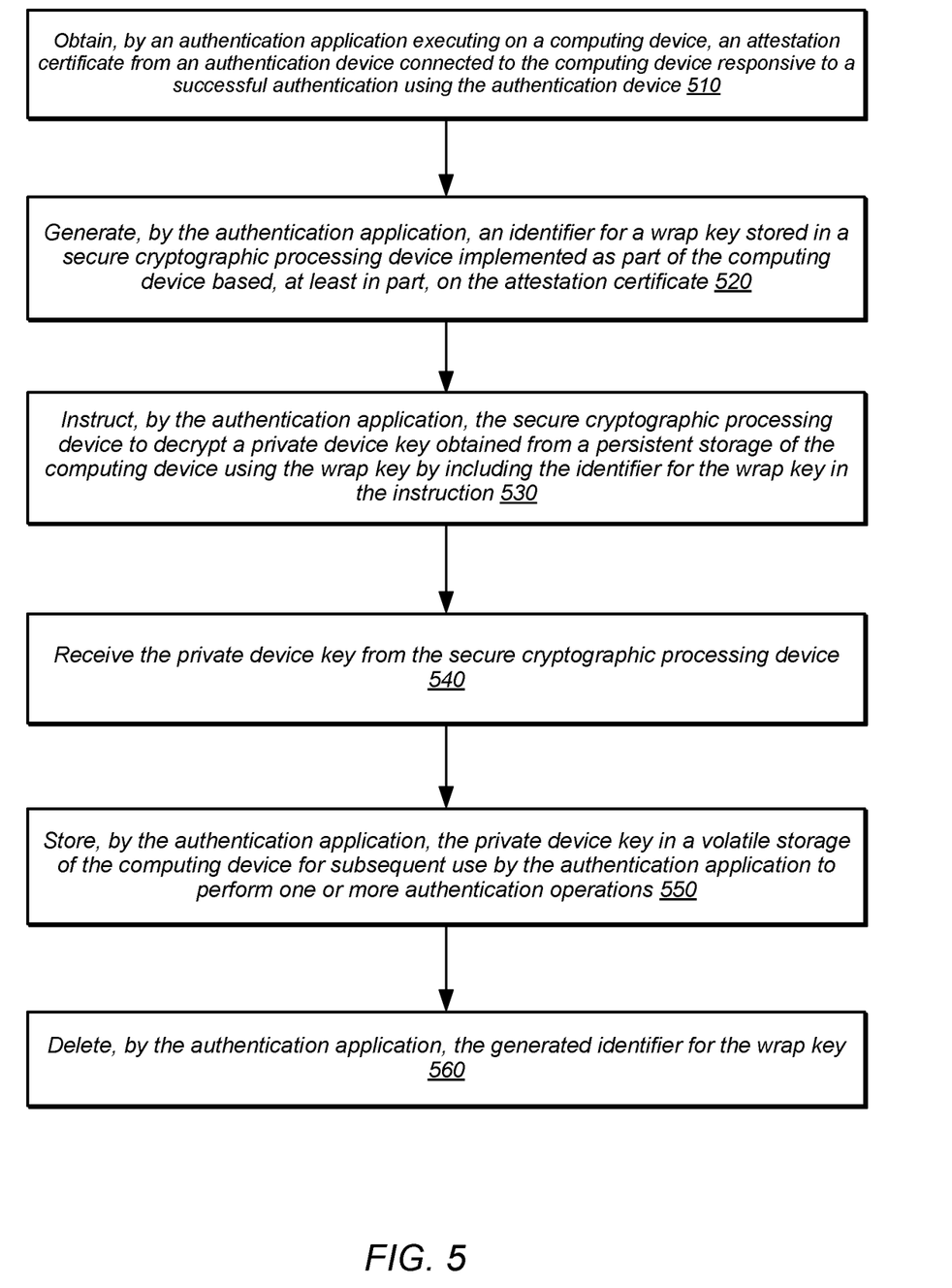
FIG. 5 is a high-level flowchart illustrating various methods and techniques to implement using an authentication device to provide authenticated access to a secure cryptographic processing device that bound a computing device to the authentication device, according to some embodiments.

FIG. 5 is a high-level flowchart illustrating various methods and techniques to implement using an authentication device to provide authenticated access to a secure cryptographic processing device that bound a computing device to the authentication device, according to some embodiments. As indicated at 510, an attestation certificate may be obtained by an authentication application from an authentication device connected to a computing device executing the authentication application responsive to a successful authentication using the authentication device, in some embodiments. For example, as discussed above, a prompt may be displayed or otherwise provided via an interface when a login or other access attempt at the device is detected. The prompt may request the connection of the authentication device to the computing device using a port on the computing device, such as a peripheral device port (e.g., Universal Serial Bus (USB) connecter port that facilitates communications using USB). As also discussed above, the authentication device may be a device that provides a challenge and response protocol with, upon successful response, return of a constant set of attributes from the authentication device (e.g., which may provide the attestation certificate). In at least some embodiments, the authentication device may be compliant with a standard such as the FIDO2 protocol, which may incorporate both a pin and user to satisfy the challenge.

As indicated at 520, an identifier for a wrap key stored in a secure cryptographic processing device implemented as part of the computing device may be generated by the authentication application based, at least in part, on the attestation certificate, in some embodiments. For example, as discussed above, one (or more portions of the attestation certificate obtained from the authentication device) and/or other attributes (e.g., unique to or descriptive of the computing device or a user account or profile that is registering the computing device) may be used to generate the identifier. Different portions and/or attributes may be combined (e.g., appended) and then hashed using a hash function or otherwise modified in a deterministic way to produce the identifier. The identifier may act as an index or other lookup value which the secure cryptographic processing device accepts and interprets to use the wrap key at a later time.

As discussed above, a secure cryptographic processing device may be a microcontroller, chip, integrated-circuit, or other on-board device that implements a secure interface for interacting with a cryptographic processor, memory, and persistent storage to perform various cryptographic operations, including storage of sensitive information such as the wrap key. In at least some embodiments, the secure cryptographic processing device may conform to a standard specification, such as Trusted Platform Module (TPM). As indicated at 530, the secure cryptographic processing device may be instructed to decrypt a private device key obtained from a persistent storage of the computing device using the wrap key by including the identifier for the wrap key in the instruction, in some embodiments. For example, a storage location in the persistent data storage of the computing device may be maintained by the authentication application in order to locate the private device key. A read or other request to retrieve the key using an interface to the persistent data storage may be sent. Persistent data storage may be disk-based, non-volatile memory, or other block-based or byte-addressable persistent storage components implemented within the computing device may be used. The instruction may be made, for example, using an interface (e.g., an API call) of the secure cryptographic processing device may be utilized that performs an unwrap function according to the identifier (e.g., sometimes referred to as a "handle" or a "key-handle") which decrypts using the wrap key the given data (e.g., private device key).

As indicated at 540, the private device key may be received form the secure cryptographic processing device, in some embodiments. For example, a response via the interface of the secure cryptographic processing device may include the decrypted private device key.

As indicated at 550, the decrypted private device key may be stored by the authentication application in a volatile storage of the computing device for subsequent use by the authentication application to perform one or more authentication operations, in some embodiments. For example, various types of volatile memory, including various types of byte-addressable random access memory may be used to store the private device key along with any other information used by the authentication application when executing. As indicated at 560, the generated identifier for the wrap key may be deleted by the authentication application, in some embodiments. For example, the identifier may be generated and stored in memory as part of executing the access to obtain the wrap key. To prevent the identifier from being obtained, the identifier may be deleted, overwritten, scrubbed and/or otherwise removed from any stored location on the computing device.

Figure 6:
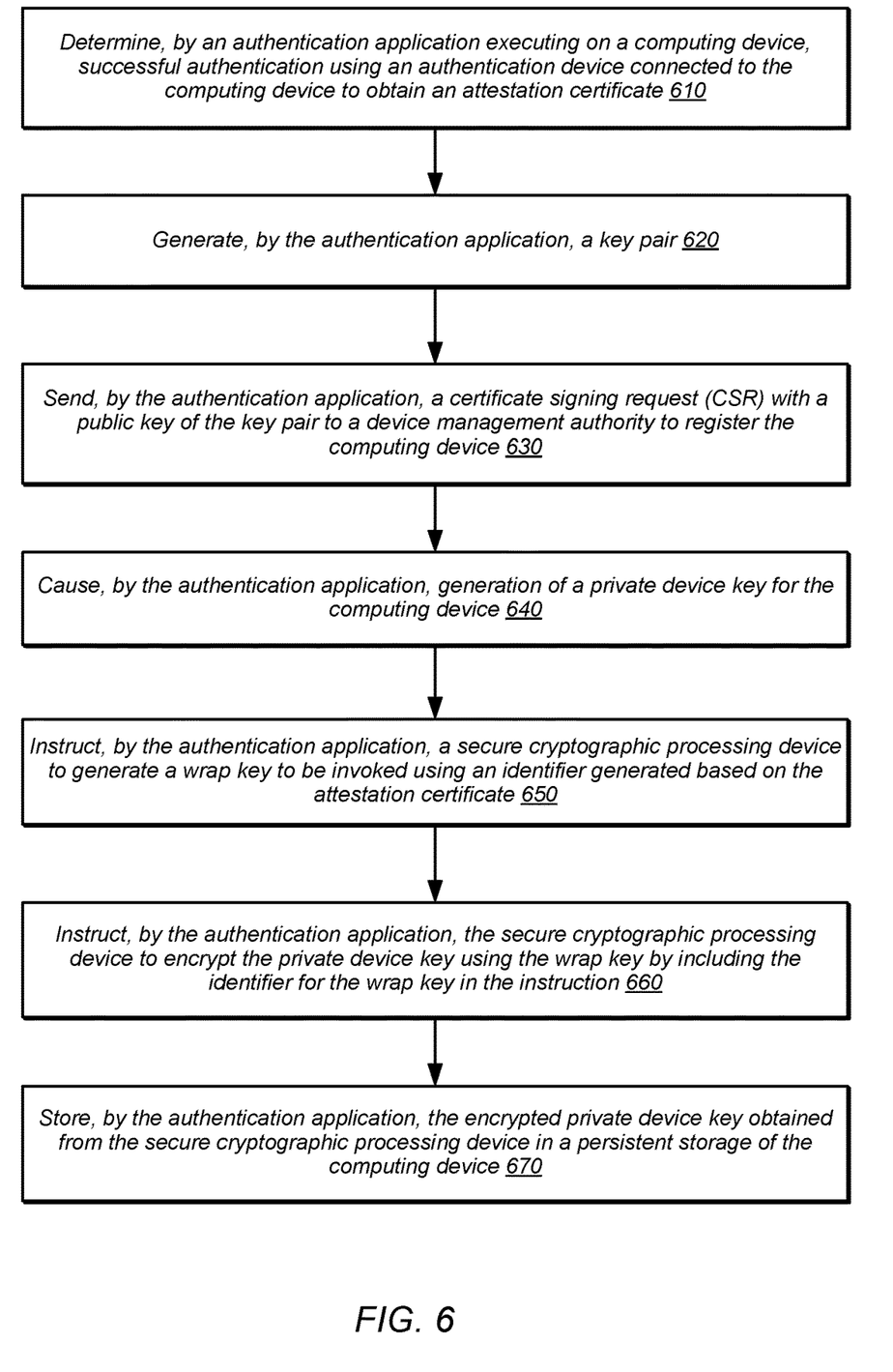
FIG. 6 is a high-level flowchart illustrating various methods and techniques to implement registering a device for authentication using an authentication device to provide authenticated access to a secure cryptographic processing device for binding the device, according to some embodiments.

FIG. 6 is a high-level flowchart illustrating various methods and techniques to implement registering a device for authentication using an authentication device to provide authenticated access to a secure cryptographic processing device for binding the device, according to some embodiments. As indicated at 610, determination, by an authentication application executing on a computing device, of a successful authentication using an authentication device connected to the computing device to obtain an attestation certificate may be made, in some embodiments. For example, as discussed above, a prompt may be displayed or otherwise provided via an interface when a login or other access attempt at the device is detected. The prompt may request the connection of the authentication device to the computing device using a port on the computing device, such as a peripheral device port (e.g., Universal Serial Bus (USB) connecter port that facilitates communications using USB). As also discussed above, the authentication device may be a device that provides a challenge and response protocol with, upon successful response, return of a constant set of attributes from the authentication device (e.g., which may provide the attestation certificate). In at least some embodiments, the authentication device may be compliant with a standard such as the FIDO2 protocol, which may incorporate both a pin and user to satisfy the challenge.

As indicated at 620, a key pair may be generated by the authentication application, in some embodiments. For example, a cryptographic key generation technique to produce a public-private key pair may be implemented. As indicated at 630, a certificate signing request (CSR) with the public key of the key pair may be sent by the authentication application to a device management authority to register the computing device, in some embodiments. For example, a network request to a server known to the authentication application which includes the CSR with the public key may be made. The device management authority may register (e.g., store the public key in a record in device management hierarchy or other data store) the device and return an identity certificate signed by the private key of the device management authority to indicate that the device is successfully registered.

As indicated at 640, a private device key for the computing device may be caused to be generated. For example, various key generation techniques using a randomly generated number and key derivation function may be used to generate the private device key. In some embodiments, the secure cryptographic processing device may be used to generate the private device key (e.g., using a random number generator or pseudo random number generator and various key generation techniques), which may then be provided back to the authentication application.

As indicated at 650, the authentication application may instruct the secure cryptographic processing device to generate a wrap key to be invoked using an identifier generated based on the attestation certificate. As discussed above with regard to FIG. 5, the identifier may be generated using one (or more portions of the attestation certificate obtained from the authentication device) and/or other attributes (e.g., unique to or descriptive of the computing device or a user account or profile that is registering the computing device) may be used to generate the identifier. Different portions and/or attributes may be combined (e.g., appended) and then hashed using a hash function or otherwise modified in a deterministic way to produce the identifier. The secure cryptographic processing device may then use the wrap key according to instructions that are received that include the identifier.

As indicated at 660, the authentication application may instruct the secure cryptographic processing device to encrypt the private device key using the wrap key by including the identifier for the wrap key in the instruction. For example, a wrap function may be invoked with the identifier and the private device key provided to the secure cryptographic processing device. The encrypted private device key may be returned to the authentication application.

As indicated at 670, the encrypted private device key may be stored by the authentication application in a persistent data storage of the computing device, in some embodiments. For example, disk-based, non-volatile memory, or other block-based or byte-addressable persistent storage components implemented within the computing device may be used.

Figure 7:
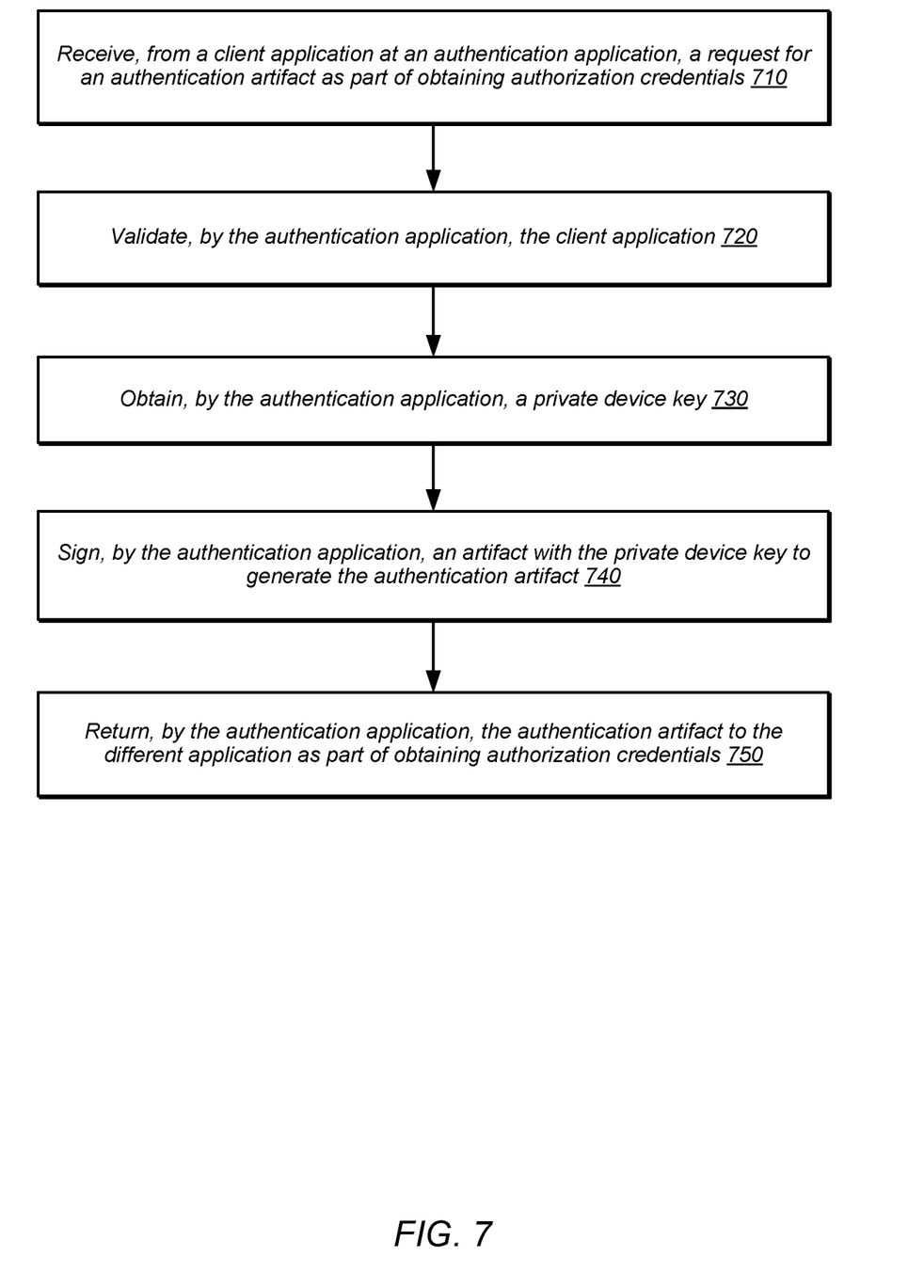
FIG. 7 is a high-level flowchart illustrating various methods and techniques to implement generating authentication artifacts using a private device key, according to some embodiments.

FIG. 7 a high-level flowchart illustrating various methods and techniques to implement generating authentication artifacts using a private device key, according to some embodiments. As indicated at 710, a request for an authentication artifact may be received from a client application at the authentication application as part of obtaining authorization credentials, in some embodiments. The request may be received through an interface, such as a programmatic interface via an API, to provide the artifact to be signed. For instance, a JSON Web Token (JWT) or other token is one example of an artifact that may be signed to generate an authentication artifact. In some embodiments, a token may have a time to live before expiring. This time to live may be short, in some embodiments (e.g., one minute). A nonce object (e.g., a random string or number) is another example of a token that may be signed to generate an authentication artifact. A nonce may be a one-time use authentication artifact.

As indicated at 720, the client application may be validated by the authentication application, in some embodiments. Some applications may not be known or trusted.

Validation may prevent unknown or untrusted applications from obtaining an authentication artifact. In some embodiments, validation may include using signature validation that utilizes a certificate authority. In some embodiments, validation may include utilizing a hashing technique (e.g., to determine whether a hash value indicates in a list of authorized applications whether an individual application represented by the hash value exists.

As indicated in 730, a private device key may then be obtained to sign the authentication artifact, in some embodiments. This obtaining of a private device key is discussed in further detail in FIG. 4 above.

As indicated at 740, the artifact may be signed with the obtained private device key to generate the authentication artifact, in some embodiments. For example, a cryptographic signing technique may be applied to produce a different version of the authentication artifact. As indicated at 750, the authentication artifact may be returned to the different application, in some embodiments.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Figure 8:
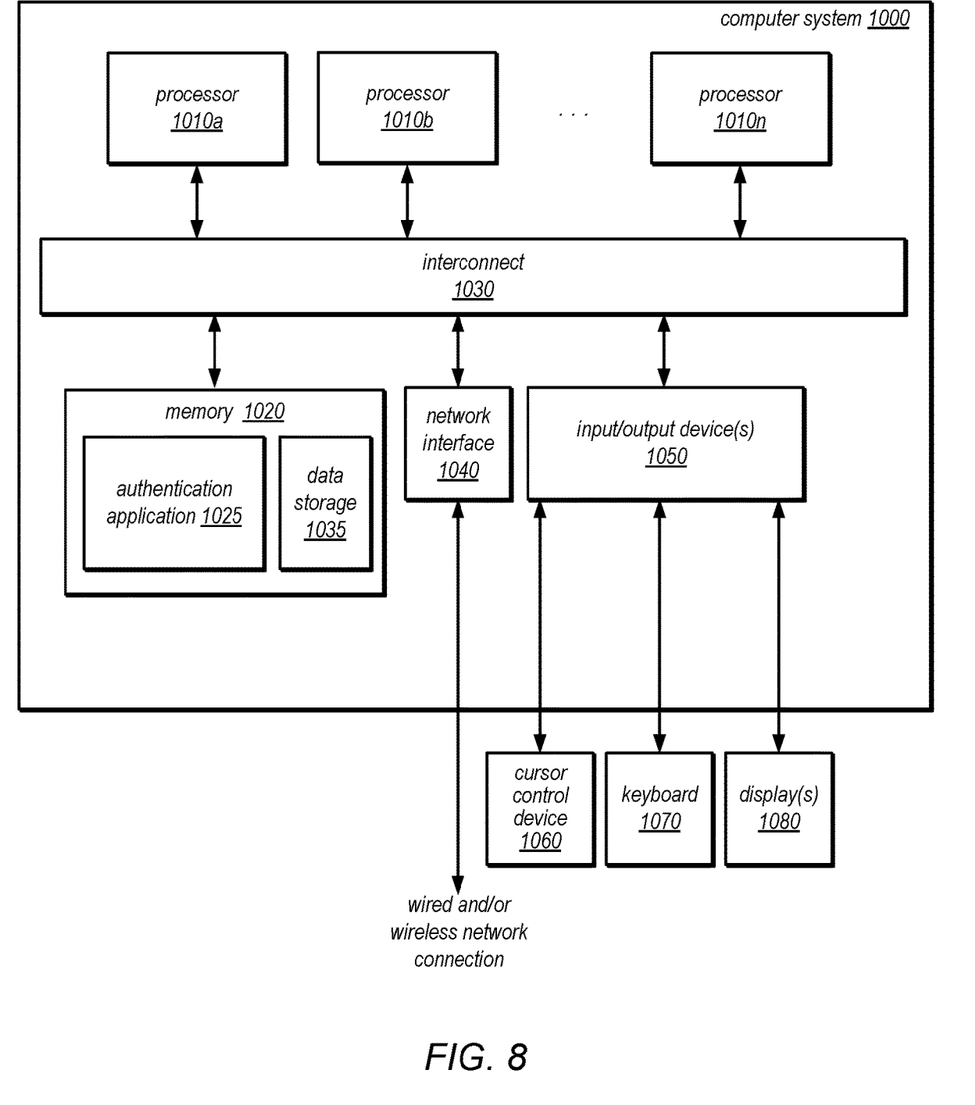
FIG. 8 is an example computer system, according to some embodiments.

Embodiments of using an authentication device to provide authenticated access to a secure cryptographic processing device that bound a computing device to the authentication device as discussed above may be implemented as part of a computer system. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions, such as program instructions to implement authentication application 120 discussed above, and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a secure cryptographic processor;
a persistent data storage;
at least one processor; and
a memory storing program instructions that, when executed by the at least one processor, cause the at least one processor to implement an authentication application configured to:
authenticate a client accessing the system;
receive, from a client application executing on behalf of the client, a request for an authentication artifact, and responsive to the request:
send a decryption request to the secure cryptographic processor requesting decryption of an encrypted device key to generate a private device key bound to the authenticated client using the system;
sign an artifact with the private device key to generate the authentication artifact; and
return, to the client application, the authentication artifact to provide, at least in part, authentication credentials for the system.

2. The system of claim 1, further comprising an authentication device, and wherein:
the secure cryptographic processor decrypts the encrypted device key using a wrap key stored in the secure cryptographic processing device and identified using a wrap key identifier provided in the decryption request;
the wrap key identifier comprises at least a portion of an attestation certificate obtained from the authentication device and one or more attributes associated with the private device key; and the attestation certificate is obtained responsive to an authentication operation using the authentication device.

3. The system of claim 1, wherein the authentication application is further configured to:
   generate a key pair comprising a public key and a private key, wherein the private key is the wrap key;
   send a certificate signing request (CSR) with the public key of the key pair to a device management authority to register the computing device;
   cause generation of the private device key;
   request the secure cryptographic processing device to encrypt the private key using the wrap key by including the generated identifier in the request;
   receive, from the secure cryptographic processing device, the encrypted private device key; and
   store the encrypted private device key in the persistent data storage.

4. The system of claim 1, wherein the authentication application is further configured to sign one or more attestations of state of the computing device using the private device key.

5. A method, comprising:
   authenticating a client accessing a computing device;
   receiving, from a client application, executing on behalf of the client, at an authentication application executing on the computing device, a request for an authentication artifact, and responsive to the request:
      obtaining a private device key bound to the authenticated client and the computing device;
      signing an artifact with the private device key to generate the authentication artifact; and
      returning, to the client application, the authentication artifact to provide, at least in part, authentication credentials for the device.

6. The method of claim 5, wherein the obtaining of the private device key comprises:
   reading an encrypted private device key from persistent data storage of the computing device; and
   sending a decryption request to a secure cryptographic processing device of the computing device to decrypt the obtained encrypted device key.

7. The method of claim 6, wherein the secure cryptographic processing device decrypts the obtained encrypted device key using a wrap key stored in the secure cryptographic processing device and identified using a wrap key identifier provided in the decryption request.

8. The method of claim 7, wherein authenticating the client accessing a computing device comprises obtaining an attestation certificate bound to the client and computing device from an authentication device connected to the computing device.

9. The method of claim 8, wherein the wrap key identifier comprises:
   at least a portion of the attestation certificate obtained from the authentication device connected to the computing device; and
   one or more attributes associated with the private device key.

10. The method of claim 5, further comprising:
    generating a key pair comprising a public key and a private key, wherein the private key is the wrap key;
    sending a certificate signing request (CSR) with the public key of the key pair to a device management authority to register the computing device;
    causing generation of the private device key;
    requesting the secure cryptographic processing device to encrypt the private key using the wrap key by including the generated identifier in the request;
    receiving, from the secure cryptographic processing device, the encrypted private device key; and
    storing the encrypted private device key in the persistent data storage.

11. The method of claim 5, further comprising validating the client application to sign the artifact.

12. The method of claim 5, further comprising:
    determining, by the authentication application, that a single sign-on operation is successfully performed; and
    receiving, from a second client application at the authentication application, a second request for a second authentication artifact, and responsive to the second request:
       obtaining the private device key for the computing device;
       signing a second artifact with the private device key to generate the second authentication artifact; and
       returning, to the second client application, the second authentication artifact to provide, at least in part, authentication credentials for the device.

13. A non-transitory, computer-readable storage medium, storing program instructions that when executed on a computing device, causes the computing device to implement:
    authenticating a client accessing the computing device;
    receiving, from a client application, executing on behalf of the client, at an authentication application executing on the computing device, a request for an authentication artifact, and responsive to the request:
       obtaining a private device key bound to the authenticated client and the computing device;
       causing an artifact to be signed with the private device key to generate the authentication artifact; and
       returning, to the client application, the authentication artifact to provide, at least in part, authentication credentials for the device.

14. The non-transitory, computer-readable storage medium of claim 13, wherein the obtaining of the private device key comprises:
    reading an encrypted private device key from persistent data storage of the computing device; and
    sending a decryption request to a secure cryptographic processing device of the computing device to decrypt the obtained encrypted device key.

15. The non-transitory, computer-readable storage medium of claim 13, wherein the secure cryptographic processing device decrypts the obtained encrypted device key using a wrap key stored in the secure cryptographic processing device and identified using a wrap key identifier provided in the decryption request.

16. The non-transitory, computer-readable storage medium of claim 13, wherein authenticating the client accessing a computing device comprises obtaining an attestation certificate bound to the client and computing device from an authentication device connected to the computing device.

17. The non-transitory, computer-readable storage medium of claim 13, wherein the wrap key identifier comprises:
    at least a portion of the attestation certificate obtained from an authentication device connected to the computing device; and
    one or more attributes associated with the private device key.

18. The non-transitory, computer-readable storage medium of claim 13, storing further instructions that when executed by the computing device, cause the computing device to further implement:
- generating a key pair comprising a public key and a private key, wherein the private key is the wrap key;
- sending a certificate signing request (CSR) with the public key of the key pair to a device management authority to register the computing device;
- causing generation of the private device key;
- requesting the secure cryptographic processing device to encrypt the private key using the wrap key by including the generated identifier in the request;
- receiving, from the secure cryptographic processing device, the encrypted private device key; and
- storing the encrypted private device key in the persistent data storage.

19. The non-transitory, computer-readable storage medium of claim 13, storing further instructions that when executed by the computing device, cause the computing device to further implement validating the client application to sign the artifact.

20. The non-transitory, computer-readable storage medium of claim 19, storing further instructions that when executed by the computing device, cause the computing device to further implement signing one or more attestations of state of the computing device using the private device key.

* * * * *